(12) United States Patent
Maurer et al.

(10) Patent No.: US 8,870,704 B2
(45) Date of Patent: Oct. 28, 2014

(54) MULTISTAGE TRANSMISSION

(71) Applicant: ZF Friedrichshafen AG, Friedrichshafen (DE)

(72) Inventors: Markus Maurer, Lindau (DE); Torsten Buechner, Friedrichshafen (DE); Dominik Steinhauser, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 14/024,757

(22) Filed: Sep. 12, 2013

(65) Prior Publication Data
US 2014/0073473 A1 Mar. 13, 2014

(30) Foreign Application Priority Data

Sep. 13, 2012 (DE) .......................... 10 2012 216 226

(51) Int. Cl.
*F16H 3/44* (2006.01)
*F16H 3/62* (2006.01)
*F16H 3/66* (2006.01)

(52) U.S. Cl.
CPC .......... *F16H 3/62* (2013.01); *F16H 2200/0056* (2013.01); *F16H 2200/2043* (2013.01); *F16H 2200/2012* (2013.01); *F16H 3/66* (2013.01)
USPC ............... 475/280; 475/5; 475/149; 475/288; 475/330

(58) Field of Classification Search
USPC ......... 475/330, 308–309, 286, 282, 280, 276, 475/271, 210, 115, 5; 77/143, 109
See application file for complete search history.

(56) References Cited

U.S. PATENT DOCUMENTS

| 1,404,675 A | 1/1922 | Wilson |
| 4,070,927 A * | 1/1978 | Polak ........................... 475/286 |

(Continued)

FOREIGN PATENT DOCUMENTS

| DE | 378413 | 7/1923 |
| DE | 27 21 719 A1 | 12/1977 |

(Continued)

OTHER PUBLICATIONS

German Search Report corresponding to DE 10 2012 216 223.2 dated May 13, 2013.

(Continued)

*Primary Examiner* — Michael Mansen
*Assistant Examiner* — Tinh Dang
(74) *Attorney, Agent, or Firm* — Davis & Bujold, PLLC; Michael J. Bujold (57) ABSTRACT

A transmission comprising a transmission (7) and a reduction stage. Sun of set (P1) is connected to the input (1), which can be releasably connected, via clutch (A), to shaft (6) connected to sun of set (P2) and sun of set (P3), and, via clutch (B), is connectable to shaft (5) connected to carrier of set (P2) and ring of set (P3). Shaft (5) is coupled to housing (G) via brake (F). Carrier of set (P1) is connected to shaft (4) connected with ring of set (P2) and is couplable, via brake (E), to housing (G). Ring of set (P1) is connected to shaft (3) which is couplable, via brake (D), to housing (G). Output (2) is connected to carrier of set (P3). Carrier of set (P4) is connected to output (2), ring of set (P4) is couplable, via brake (H), to housing (G), and sun of set (P4) is connected to the shaft (6).

13 Claims, 4 Drawing Sheets

(56) References Cited

U.S. PATENT DOCUMENTS

| | | | |
|---|---|---|---|
| 5,593,357 | A | 1/1997 | Justice et al. |
| 6,962,549 | B2 | 11/2005 | Dreibholz et al. |
| 7,014,589 | B2 | 3/2006 | Stevenson |
| 7,892,144 | B2 * | 2/2011 | Steinhauser et al. .......... 477/143 |
| 8,113,983 | B2 | 2/2012 | Gumpoltsberger |
| 8,398,516 | B2 * | 3/2013 | Smith et al. ................... 475/115 |
| 8,398,522 | B2 | 3/2013 | Bauknecht et al. |
| 8,480,530 | B2 * | 7/2013 | Phillips ........................ 475/210 |
| 8,556,766 | B2 * | 10/2013 | Mellet et al. .................. 475/276 |
| 8,602,934 | B2 * | 12/2013 | Mellet et al. ....................... 475/5 |
| 2007/0287588 | A1 * | 12/2007 | Steinhauser et al. .......... 477/109 |
| 2009/0143196 | A1 * | 6/2009 | Smith et al. ................... 477/143 |
| 2012/0214635 | A1 * | 8/2012 | Mellet et al. .................. 475/276 |

FOREIGN PATENT DOCUMENTS

| | | |
|---|---|---|
| DE | 42 34 572 A1 | 4/1994 |
| DE | 102 44 023 A1 | 4/2004 |
| DE | 10 2004 029 952 A1 | 1/2005 |
| DE | 10 2007 022 776 A1 | 12/2008 |
| DE | 10 2008 000 429 A1 | 9/2009 |
| DE | 10 2010 039 862 A1 | 3/2012 |
| EP | 0 965 773 A1 | 12/1999 |
| JP | H07 54941 A | 2/1995 |
| JP | H08 74952 A | 3/1996 |
| JP | 2006 046390 A | 2/2006 |
| JP | 2010 203 542 A | 9/2010 |

OTHER PUBLICATIONS

German Search Report corresponding to DE 10 2012 216 226.7 dated May 13, 2013.

German Search Report corresponding to DE 10 2012 216 225.9 dated May 13, 2013.

* cited by examiner

| GEAR/SE | TRANSMISSION RATIO | CLAW/FRICTION A | FRICTION B | FRICTION D | FRICTION E | FRICTION F | CLAW H | GEAR CHANGE | GEAR INCREMENT | SHIFT TYPE |
|---|---|---|---|---|---|---|---|---|---|---|
| 1 | 5.55 | X | | | | | X | | | |
| 2 | 3.36 | X | | | | X | | 1->2 | 1.65 | SHIFT UNDER LOAD |
| 3 | 1.91 | X | | | X | | | 2->3 | 1.76 | SHIFT UNDER LOAD |
| 4 | 1.42 | X | | X | | | | 3->4 | 1.34 | SHIFT UNDER LOAD |
| 5 | 1.00 | X | X | | | | | 4->5 | 1.42 | SHIFT UNDER LOAD |
| 6 | 0.72 | | X | X | | | | 5->6 | 1.39 | SHIFT UNDER LOAD |
| 7 | 0.62 | | X | | X | X | | 6->7 | 1.17 | SHIFT UNDER LOAD |
| R | | | | X | | X | | | | |
| OVERALL GEAR RATIO SPREAD: | 9.02 | | | | | | | | | |

Fig. 2

MULTISTAGE TRANSMISSION

This application claims priority from German application Serial No 10 2012 216 226.7 filed on Sep. 13, 2012.

FIELD OF THE INVENTION

The present invention relates to a multistage transmission of planetary design, in particular an automatic transmission for a motor vehicle.

BACKGROUND OF THE INVENTION

According to the prior art, automatic transmissions, particularly for motor vehicles, comprise planetary gear sets that are shifted using friction elements or shift elements such as clutches and brakes, and typically are connected to a start-up element, such as a hydrodynamic torque converter or a fluid coupling, that is subject to a slip effect and is provided optionally with a lock-up clutch.

Automatically shiftable vehicle transmissions of planetary design are already generally described numerous times in the prior art and are continually undergoing further development and improvement. These transmissions should have a relatively simple design, in particular requiring a low number of shift elements, and minimize the need for double shifting when sequential shifting is performed, that is, avoiding engaging or disengaging two shift elements, thereby ensuring that only one shift element is ever switched when shifting is performed in defined groups of gears.

The document DE 2721719 A1 describes a multistage transmission in planetary design having six forward gears and one reverse gear comprising three minus planetary gear sets, called the first, second and third planetary gear set in the following, disposed in a housing, six rotatable shafts, called the drive shaft, output shaft, third, fourth, fifth and sixth shaft in the following, and five shift elements. Here, the sun gear of the first planetary gear set is connected to the drive shaft which, via a first clutch, can be releasably connected to the sixth shaft connected to the sun gear of the second planetary gear set and to the sun gear of the third planetary gear set, and via a second clutch can be releasably connected to the fifth shaft, connected to the carrier of the second planetary gear set and the ring gear of the third planetary gear set, and which can be coupled via a third brake to the housing. With the known transmission it is also provided that the carrier of the first planetary gear set is connected to the fourth shaft, which is connected to the ring gear of the second planetary gear set and can be coupled via a second brake to the housing, and that the ring gear of the first planetary gear set is connected to the third shaft, which can be coupled via a first brake to the housing, wherein the output shaft is connected to the carrier of the third planetary gear set. The brakes and clutches of the transmission are implemented as friction engaged shift elements, particularly as multi-disk shift elements.

Because two engaged shift elements are required for each gear with the transmission according to the document DE 2721719 A1, with each gear, three friction engaged shift elements are disengaged, which disadvantageously results in undesired drag torques that negatively influence the efficiency of the transmission.

Further, with a 7 speed transmission proposed in the document DE 2721719 A1, it is provided that the first clutch is engaged for the first five forward gears, wherein the fourth brake only is required, and shifted into the power flow, for implementing the first forward gear and the reverse gear. This means that the first clutch and the fourth brake, because they are required for the first forward gear, are designed such that they support the entire engine torque including the maximum conversion. For the further gears of the transmission, a substantially smaller design of the shift elements would be sufficient.

Engaging a gear in the first forward gear, the coasting and tractive downshift from second gear into the first forward gear, and the coasting and tractive downshift from sixth gear into the fifth forward gear, are qualitatively negatively influenced due to the maximum dimensioning of the first clutch and the fourth brake. In order to optimize the shift quality with these shifts, the number of disks for the first clutch and the third brake is reduced according to the prior art, which however disadvantageously results in reduced transfer capability of these shift elements in the first forward gear.

From the prior art, for example from the documents DE 10 2008 000 429 A1 and DE 10 2007 022 776 A1 by the applicant, transmissions in planetary design are known, in which a portion of the shift elements are implemented as form-locking shift elements.

Due to the design of a portion of the shift elements of a transmission as form-locking shift elements, the power loss due to the drag torque of disengaged shift elements is reduced, and the transfer capability is increased with respect to the shift elements, wherein the mechanical overall gear ratio spread remains the same.

The mechanical overall gear ratio spread of a transmission is a key control variable for operating the upstream internal combustion engine at an optimal operating point, whereby the fuel consumption can be reduced. Further, the mechanical overall gear ratio spread of a transmission is an important parameter in order to attain specific driving performance in special applications.

Further developments of existing transmissions known from the prior art, implemented to be shiftable under load, result in a slight increase of the overall gear ratio spread and are disadvantageously complex and expensive.

Further, from the prior art it is known to combine automatic transmissions with additional automatically shiftable distributor transmissions, which are integrated in the drive strategy, for representing a group shift, thereby increasing the mechanical overall gear ratio spread.

However, this design has the disadvantage that a two-stage distributor transmission is necessary for representing a group shift, which results in high manufacturing and assembly costs and large construction space needs. The distributor transmission, as a rule, is implemented as a transmission in countershaft design. Additionally, the distributor transmission, with respect to the attainable transmission ratio, the design of the form-locking shift elements and the synchronization measures, must be adapted to the upstream transmission and the internal combustion engine. In addition, the group shifts disadvantageously cannot be shifted under load.

SUMMARY OF THE INVENTION

Starting from a transmission according to DE 2721719 A1, the problem addressed by the present invention is to propose a multistage transmission with which a high mechanical overall gear ratio spread and a high reduction ratio are implemented in a simple constructive manner and with small construction space requirements.

Additionally, in the scope of a further development of the invention, the power loss due to the drag torques of disengaged shift elements is to be reduced and the transfer capability is to be increased, with optimized shift quality with respect to the shift elements.

Accordingly, a multistage transmission according to the invention is proposed in planetary design, comprising a basic transmission and a reduction stage downstream of the basic transmission, which are disposed in a common housing, wherein the basic transmission comprises an input drive and an output drive, which are disposed in a housing, three planetary gear sets, designated in the following as the first, second and third planetary gear set, at least six rotatable shafts, designated in the following as drive shaft, output shaft, third, fourth, fifth and sixth shaft, and at least five shift elements, the selective engagement of which results in different transmission ratios between the input drive and the output drive, wherein the sun gear of the first planetary gear set is connected to the drive shaft, which, via a first clutch, can be releasably connected to the sixth shaft connected to the sun gear of the second planetary gear set and to the sun gear of the third planetary gear set, and via a second clutch can be releasably connected to the fifth shaft connected to the carrier of the second planetary gear set and the ring gear of the third planetary gear set; the fifth shaft can be coupled via a third brake to the housing.

Additionally, the carrier of the first planetary gear set is connected to the fourth shaft, which is connected to the ring gear of the second planetary gear set and can be coupled to the housing via a second brake, wherein the ring gear of the first planetary gear set is connected to the third shaft, which can be coupled to the housing via a first brake, and wherein the output shaft is connected to the carrier of the third planetary gear set.

According to the invention, the reduction stage has a minus planetary gear set, which is designated in the following as the fourth planetary gear set, the carrier of which is connected to the output shaft of the basic transmission, the ring gear of which can be coupled to the housing of the multistage transmission via a form-locking shift element, designated in the following as the fourth brake, and the sun gear of which is connected to the sixth shaft of the basic transmission.

The planetary gear sets of the basic transmission are preferably implemented as minus planetary gear sets.

As is well known, a simple minus planetary gear set comprises a sun gear, a ring gear, and a carrier on which the planetary gears are rotatably supported, the planetary gears meshing with the sun gear and the ring gear. As a result, when the carrier is fixed, the ring gear has a direction of rotation that is opposite that of the sun gear. In contrast, a simple plus planetary gear set comprises a sun gear, a ring gear and a carrier, on which inner and outer planet gears are rotatably supported, wherein all inner planet gears mesh with the sun gear and all outer planet gears mesh with the ring gear, and each inner planet gear meshes with only one outer planet gear. As a result, when the carrier is fixed, the ring gear has the same direction of rotation as the sun gear, and results in a positive stationary transmission ratio.

Here, the first clutch of the basic transmission can be implemented as a form-locking shift element (claw shift element) or as a multi-disk shift element, wherein the second clutch and the first, second and third brakes are implemented as multi-disk shift elements. Due to the design of the first clutch of the basic transmission as a form-locking shift element, the power loss due to drag torque is reduced.

Due to the concept according to the invention, starting from the basic transmission, the mechanical overall gear ratio spread is increased, wherein a high reduction ratio is attained. Advantageously, the required constructive expense is low because the existing transmission is expanded by a simple claw-shifted planetary gear set that can be shifted under load, which leads to an expansion by an additional auxiliary gear that can be shifted under load. Additionally, smaller additional construction space is required because the basic transmission is expanded by a simple minus planetary gear set. A further advantage consists in that the basic transmission remains unchanged.

BRIEF DESCRIPTION OF THE DRAWINGS

The invention is described in greater detail in the following, as an example, with reference to the attached figures. They show.

DETAILED DESCRIPTION OF THE DRAWINGS

Figure 1:
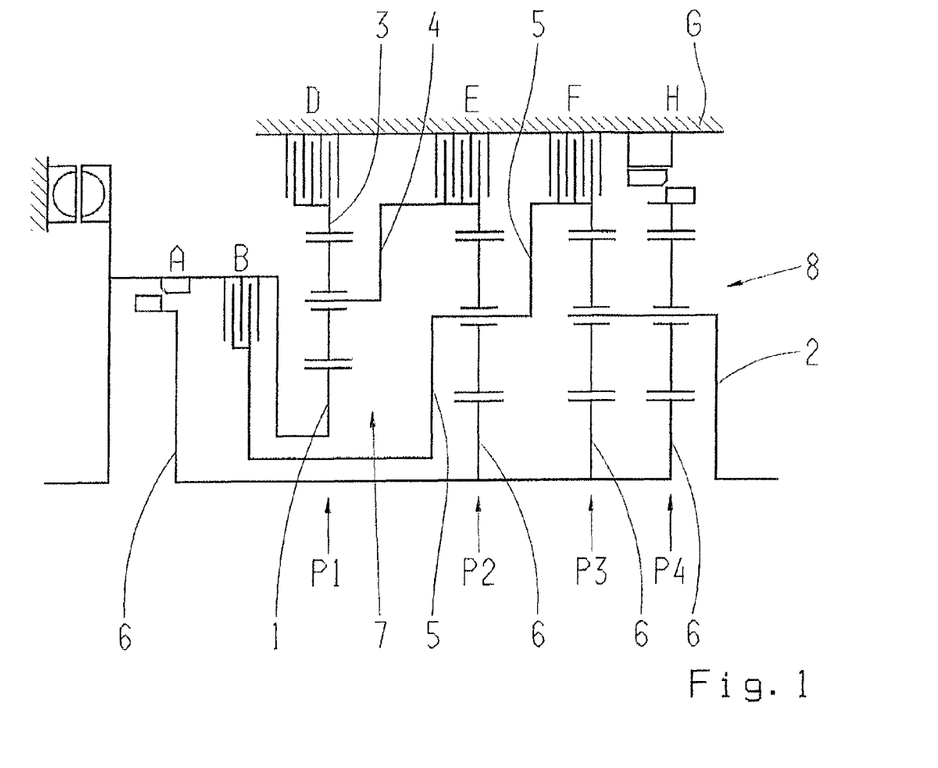
FIG. 1: a schematic view of a preferred embodiment of a multistage transmission according to the invention, comprising a claw shifted reduction stage.

FIG. 1 shows a multistage transmission according to the invention comprising a basic transmission 7 and a reduction stage 8 that is downstream of the basic transmission 7. The basic transmission 7 comprises an input shaft 1, an output shaft 2 and three planetary gear sets P1, P2 and P3, which are disposed in a housing G. The planetary gear sets P1, P2, P3, in the example shown are designed as minus planetary gear sets. Here, at least one of the planetary gear sets P1, P2, P3 can be implemented as a plus planetary gear set if the carrier and ring gear connection are exchanged and, simultaneously, the value of the stationary transmission ratio is increased by 1 in comparison to the embodiment as a minus planetary gear set.

With the example embodiment shown, viewed in the axial direction, the planetary gear sets P1, P2, P3 are disposed in a series of the first planetary gear set P1, second planetary gear set P2, third planetary gear set P3. The axial sequence of the individual planetary gear sets and the arrangement of the shift elements are freely selectable, as long as the connectability of the elements permits this.

As seen in FIG. 1, the basic transmission 7 has five shift elements, namely three brakes D, E, F and two clutches A, B. The spatial disposition of the shift elements can be arbitrary, and is limited only by the dimensions of the outer design. The basic transmission, according to the invention, has a total of six rotatable shafts, namely, the shafts 1, 2, 3, 4, 5 and 6, wherein the drive shaft forms the first shaft 1 and the output shaft forms the second shaft 2 of the basic transmission 7.

With the basic transmission 7, the sun gear of the first planetary gear set P1 is connected to the drive shaft 1, which, via a first clutch A, can be releasably connected to the sixth shaft 6 connected to the sun gear of the second planetary gear set P2 and to the sun gear of the third planetary gear set P3, and, via a second clutch B, can be releasably connected to the fifth shaft 5, that is connected to the carrier of the second planetary gear set P2 and the ring gear of the third planetary gear set P3, wherein the fifth shaft 5 can be coupled, via a third brake F, to the housing G.

With reference to FIG. 1, the carrier of the first planetary gear set P1 is connected to the fourth shaft 4, which is connected to the ring gear of the second planetary gear set P2 and can be coupled to the housing G via a second brake E. Additionally, the ring gear of the first planetary gear set P1 is connected to the third shaft 3, which can be coupled to the housing G via a first brake D, wherein the output shaft 2 is connected to the carrier of the third planetary gear set P3.

With the example shown, the first clutch A is designed as a claw shift element, wherein the second clutch B and the first, second and third brakes D, E, F are designed as multi-disk shift elements. Alternatively, it is also possible to implement the first clutch A as a multi-disk shift element.

The multistage transmission according to the invention has a reduction stage 8, which has a minus planetary gear set P4, which serves as a fourth planetary gear set P4 of the multistage transmission. As seen in FIG. 1, the carrier of the fourth planetary gear set P4 is connected to the output shaft 2 of the basic transmission 7, wherein the ring gear of the fourth planetary gear set P4 can be coupled to the housing G via a fourth brake H, implemented as a form-locking shift element (claw shift element), and wherein the sun gear of the fourth planetary gear set P4 is connected to the sixth shaft 6 of the basic transmission 7. No additional pressure regulator is required for actuating the fourth brake H because magnet valves can be used for this purpose. The reduction stage 8 is integrated into the multistage transmission, wherein the basic transmission 7 and the reduction stage 8 are disposed in a common housing.

According to a further development of the invention, the fourth brake H can be controlled via an external actuation (diagrammatically shown in FIG. 1A), for example pneumatically. This results in the advantage that the hydraulic control of the basic transmission 7 is not changed.

Figure 2:
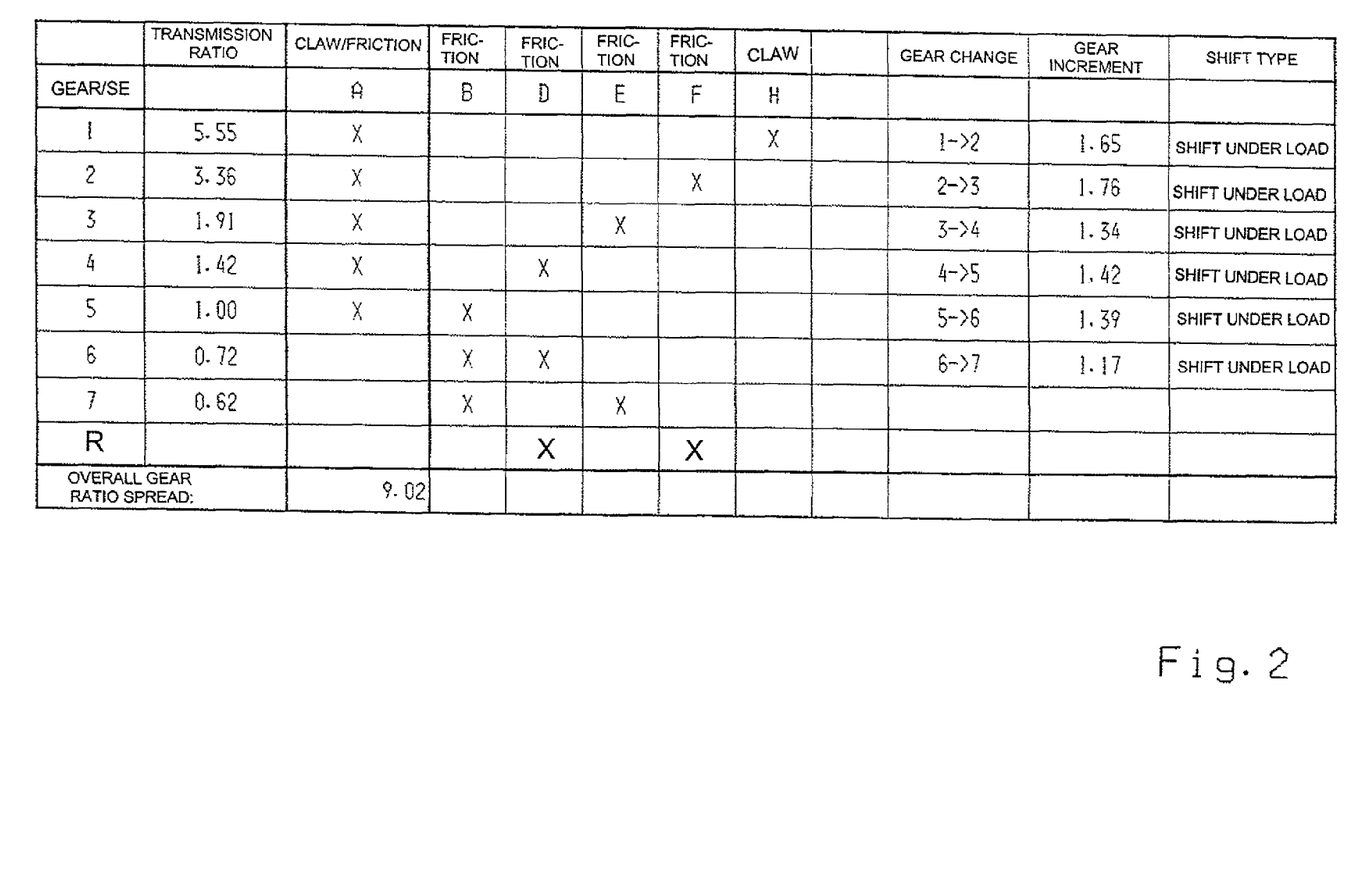
FIG. 2: an example of a shift pattern for the forward gears of the multistage transmission according to FIG. 1.

FIG. 2 shows an example shift pattern for the forward gears of a multistage transmission according to FIG. 1, wherein seven forward gears can be implemented. With the example shown, seven forward gears can be implemented, wherein the gear changes 1-2, 2-3, 3-4, 4-5, 5-6, 6-7, and 7-6, 6-5, 5-4, 4-3, 3-2, 2-1 can be shifted under load. In the example shown, the mechanical overall gear ratio spread is 9.02. As seen in FIG. 2, a high reduction ratio and a high mechanical overall total gear spread are attained; because the first forward gear has a very high transmission ratio, it is required only in extreme situations.

The first forward gear results from engaging the first clutch A and the fourth brake H; the second forward gear results from engaging the first clutch A and the third brake F; the third forward gear results from engaging the first clutch A and the second brake E; the fourth forward gear results from engaging the first clutch A and the first brake D; the fifth forward gear implemented with the example shown as a direct gear results from engaging the first and second clutches A, B; the sixth forward gear results from engaging the second clutch B and the first brake D; and the seventh forward gear results from engaging the second clutch B and the second brake E.

A reverse gear R, as shown in FIG. 2, results from engaging the first brake D and the third brake F.

Because the fourth brake H is implemented as a claw shift element, the coasting downshift 2-1 during travel is implemented as a tractive downshift, wherein the synchronization preferably occurs by actuating the third brake F; alternatively the coasting downshift 2-1 can be performed at standstill.

With tractive upshifts, the first clutch A and the fourth brake H are each the shift elements to be disengaged. Here, the disengaging shift element implemented as a claw shift element is shifted out of the power flow uncontrolled during the load transfer, and the required synchronization is performed by the multi-disk shift element to be engaged.

For the case of a tractive downshift, that is, for the case of a downshift with positive engine torque, in which the fourth brake H, implemented as a claw shift element, or the first clutch A participate, namely for a tractive downshift 2-1 and 6-5, the first clutch A and the fourth brake H are each the shift element to be engaged. Here, the shift element to be engaged is shifted into the power flow, uncontrolled at the synchronization point, and the required synchronization is performed by the multi-disk shift element to be disengaged.

For the case of a coasting upshift, that is, an upshift with negative engine torque, in which the fourth brake H, implemented as a claw shift element, or the first clutch A participate, namely for a coasting upshift 1-2 and 5-6, the first clutch A and the fourth brake H are each the shift elements that are to be disengaged. Here, the shift element to be disengaged is shifted out of the power flow uncontrolled, and the required synchronization is performed by the engine driving torque or the multi-disk shift element to be disengaged.

For the case of a coasting downshift, that is, a downshift with negative engine torque, in which the fourth brake H implemented as a claw shift element or the first clutch A participate, namely for a coasting downshift 2-1 and 6-5, the first clutch A and the fourth brake H are each the shift elements to be engaged. Here, the shift element to be engaged is shifted into the power flow uncontrolled, and the required synchronization is performed by the a positive engine engagement, that its, by an increase in rotational speed or by appropriate actuation of a multi-disk shift element.

According to the invention, the multistage transmission can be hybridized, whereby, in conjunction with the high overall gear ratio spread, a purely electric drive is possible by decoupling the drive. Advantageously here, the basic transmission 7 remains unaffected.

Here, according to a first variant of the invention, an electric machine, or alternatively a hydraulic motor or pneumatic motor or a flywheel storage device, is attached to the reduction stage 8 in such a manner that the transmission ratio of the reduction stage 8 serves as a reduction of the electric machine, and thus is used for increasing torque of the electric machine. Preferably, the rotor of the electric machine is connected, or can be releasably connected, to the carrier of the fourth planetary gear P4.

According to a further embodiment, an electric machine, or alternatively a hydraulic motor or pneumatic motor or a flywheel storage device, can be connected in tractive mode, downstream of the reduction stage 8 in the power flow direction, wherein the rotor of the electric machine is connected, or can be releasably connected, to the carrier of the fourth planetary gear set P4.

According to the invention, it is also optionally possible to provide additional freewheels at each suitable location of the multistage transmission, for example, between a shaft and the housing, or possibly to connect two shafts.

An axle differential and/or a distributor differential can be disposed on the drive side or on the output side.

The multistage transmission according to the invention also makes it possible to dispose a torsional-vibration damper between the drive engine and the transmission.

Within the scope of a further, not represented embodiment of the invention, a wear-free brake, for instance, a hydraulic or electric retarder or the like, can be disposed on each shaft, preferably on the drive shaft 1 or the output shaft 2, which is of special significance for use in commercial vehicles in particular. Furthermore, a power take-off drive can be provided on each shaft, preferably on the drive shaft 1 or the output shaft 2, for driving additional assemblies.

Figure 1A:
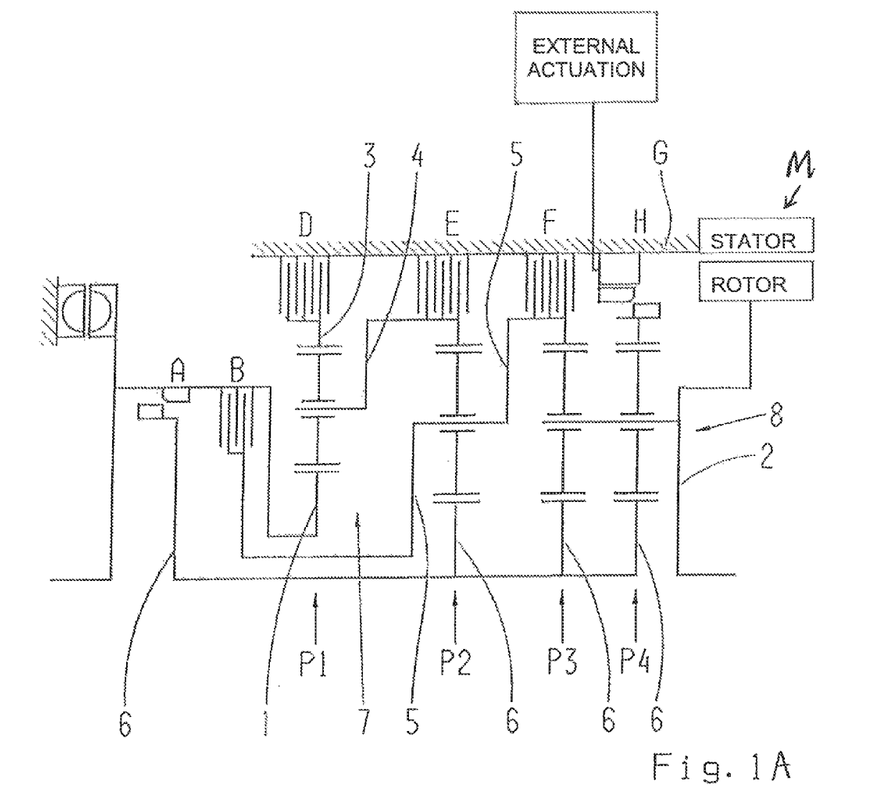
FIG. 1A: a schematic view of an embodiment of a multistage transmission according to the invention, with an electric machine connected thereto.
Figure 1B:
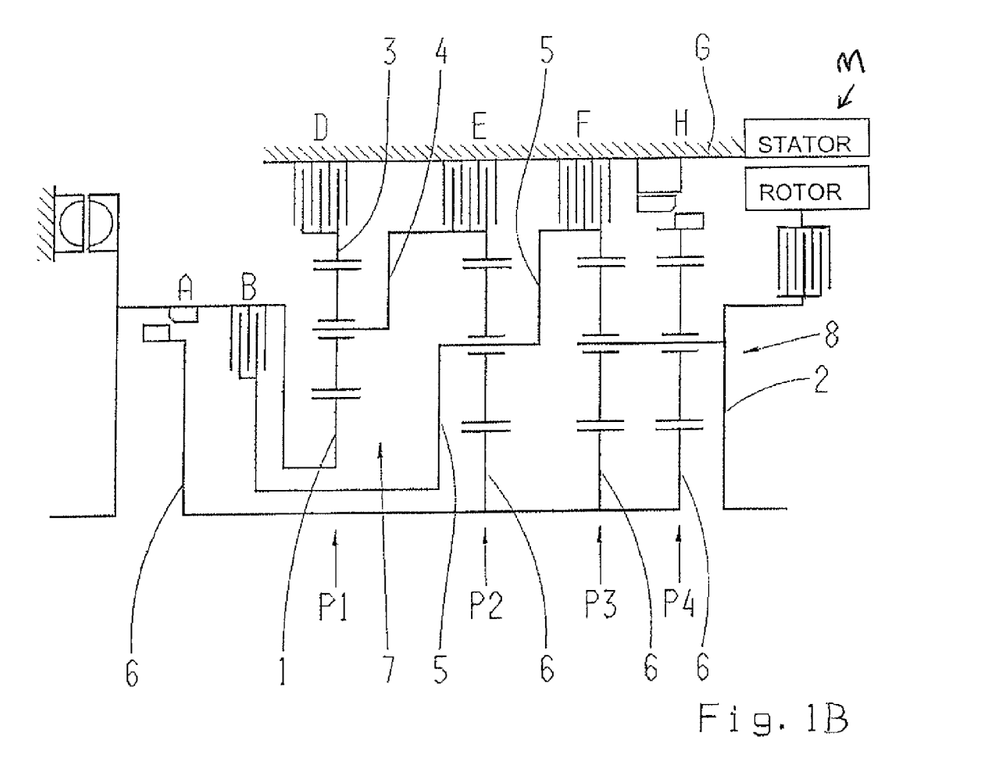
FIG. 1B: a schematic view of an another embodiment of a multistage transmission, according to the invention, with an electric machine connected thereto via a clutch.

A further advantage of the multistage transmission presented here is that an electric machine can be attached to each shaft as a generator and/or as an additional drive machine as shown in FIGS. 1A and 1B. In those Figures, an electric machine M is attached to the reduction stage 8 so that the transmission ratio of the reduction stage 8 serves as a reduction of the electric machine M, and thus is used for increasing torque of the electric machine M. The rotor of the electric machine M is connected (FIG. 1A), or can be releasable connected (FIG. 1A), to the carrier of the planetary gear set P4 via a clutch, for example.

REFERENCE CHARACTERS

1 first shaft, drive shaft
2 second shaft, output shaft
3 third shaft
4 fourth shaft
5 fifth shaft
6 sixth shaft
7 basic transmission
8 reduction stage
A first clutch
B second clutch
D first brake
E second brake
F third brake
H fourth brake
G housing
P1 first planetary gear set
P2 second planetary gear set
P3 third planetary gear set
P4 fourth planetary gear set

The invention claimed is:

1. An automatic multistage transmission of a planetary design for a motor vehicle, the multistage transmission comprising:
   a basic transmission (7) and a reduction stage (8) that is located downstream of the basic transmission (7), and both the basic transmission (7) and the reduction stage (8) being located in a common housing (G);
   the basic transmission (7) comprising:
      a drive shaft (1), an output shaft (2) and third, fourth, fifth and sixth rotatable shafts (3, 4, 5, 6);
      first, second and third planetary gear sets (P1, P2, P3) which are located within the housing (G), each of the first planetary gear set (P1), the second planetary gear set (P2) and the third planetary gear set (P3) comprising a sun gear, a ring gear and a carrier;
      five shift elements (A, B, D, E, F) comprising first, second and third brakes (D, E, F) and first and second clutches (A, B) and selective engagement thereof resulting in first, second, third, fourth, fifth, sixth and seventh forward gear transmission ratios, from highest to lowest transmission ratio respectively, between the drive shaft (1) and the output shaft (2);
      the drive shaft (1) being continuously connected to the sun gear of the first planetary gear set (P1) and being connectable, via the first clutch (A), to the sixth shaft (6) and, via the second clutch (B), to the fifth shaft (5);
      the output shaft (2) being continuously connected to the carrier of the third planetary gear set (P3);
      the third shaft (3) being continuously connected to the ring gear of the first planetary gear set (P1) and being connectable, via the first brake (D), to the housing (G);
      the fourth shaft (4) being continuously connected to the carrier of the first planetary gear set (P1) and the ring gear of the second planetary gear set (P2), and being connectable, via the second brake (E), to the housing (G);
      the fifth shaft (5) being continuously connected to the carrier of the second planetary gear set (P2) and the ring gear of the third planetary gear set (P3), and being connectable, via the third brake (F), to the housing (G); and
      the sixth shaft (6) being continuously connected to the sun gear of the second planetary gear set (P2) and to the sun gear of the third planetary gear set (P3);
   the reduction stage (8) comprising:
      a fourth planetary gear set (P4) designed as a minus planetary gear set (P4) having a sun gear, a ring gear and a carrier;
      the carrier of the fourth planetary gear set (P4) being continuously connected to the output shaft (2);
      the ring gear of the fourth planetary gear set (P4) being connectable, via a fourth brake (H), to the housing (G), the fourth brake (H) being designed as a form-locking shift element, the fourth brake being engaged in the first transmission ratio, and
      the sun gear of the fourth planetary gear set (P4) being continuously connected to the sixth shaft (6).

2. The multistage transmission according to claim 1, wherein the first clutch (A) of the basic transmission (7) and the fourth brake are form-locking shift elements, and the second clutch (B), the first brake (D), the second brake (E) and the third brake (F) of the basic transmission (7) are multi-disk shift elements and are axially arranged between the form-locking shift elements.

3. The multistage transmission according to claim 1, wherein the first planetary gear set (P1), the second planetary gear set (P2) and the third planetary gear set (P3) are each minus planetary gear sets, and the form locking shift element couples only the ring gear of the fourth planetary gearset to the housing.

4. The multistage transmission according to claim 1, wherein the first, the second and the third planetary gear sets are axially sequentially arranged in an order of the first planetary gear set (P1), the second planetary gear set (P2), the third planetary gear set (P3).

5. The multistage transmission according to claim 1, wherein the fourth brake (H) is controlled via an external actuation.

6. The multistage transmission according to claim 1, wherein the first brake (D), the second brake (E), the third brake (F) and the fourth brake (H) and the first clutch (A) and the second clutch (B) are actuatable for implementing the first, the second, the third, the fourth, the fifth, the sixth and the seventh forward gear transmission ratios and one reverse gear transmission ratio,
   the first forward gear transmission ratio is implemented by engagement of the first clutch (A) and the fourth brake (H),
   the second forward gear transmission ratio is implemented by engagement of the first clutch (A) and the third brake (F),
   the third forward gear transmission ratio is implemented by engagement of the first clutch (A) and the second brake (E),
   the fourth forward gear transmission ratio is implemented by engagement of the first clutch (A) and the first brake (D),
   the fifth forward gear transmission ratio is implemented by engagement of the first clutch (A) and the second clutch (B),
   the sixth forward gear transmission ratio is implemented by engagement of the second clutch (B) and the first brake (D), the seven forward gear transmission ratio is implemented by engagement of the second clutch (B) and the second brake (E); and the reverse gear transmission ratio is implemented by engagement of the first brake (D) and the third brake (F).

7. The multistage transmission according to claim 6, wherein for a tractive upshift in which either the first clutch (A), designed as a form-locking shift element, or the fourth brake (H) are participating, and the first clutch (A) and the fourth brake (H) are the shift element to be disengaged, and the shift element to be disengaged is shifted out of a power flow during load transfer, and required synchronization is performed by a multi-disk shift element to be engaged.

8. The multistage transmission according to claim 6, wherein, for a tractive downshift in which one of the first clutch (A), designed as a form-locking shift element, and the fourth brake (H) are participating, and the first clutch (A) and the fourth brake (H) are the shift element to be engaged, and the shift element to be engaged is shifted into a power flow with a load transfer at a synchronization point, and required synchronization is performed by a multi-disk shift element to be disengaged.

9. The multistage transmission according to claim 6, wherein for a coasting upshift in which one of the first clutch (A), designed as a form-locking shift element, and the fourth brake (H) are participating, and the first clutch (A) and the fourth brake (H) are the shift element to be disengaged, the shift element to be disengaged is shifted out of a power flow, and required synchronization is performed by either engine drive torque or by a multi-disk shift element.

10. The multistage transmission according to claim 6, wherein for a coasting downshift in which one of the first clutch (A), designed as a form-locking shift element, and the fourth brake (H) are participating, and the first dutch (A) and the fourth brake (H) are the shift element to be engaged, the shift element to be engaged is shifted into a power flow, and required synchronization is performed by either a positive engine engagement or by appropriate actuation of a multi-disk shift element.

11. The multistage transmission according to claim 6, wherein an electric machine is connectable, in a flow of power in tractive mode, downstream of the reduction stage (8), and a rotor of the electric machine is either connected or connectable to the carrier of the fourth planetary gear set (P4).

12. The multistage transmission according to claim 1, wherein an electric machine is attached to the output shaft at the reduction stage (8) such that a transmission ratio of the reduction stage (8) serves as a reduction of the electric machine, and is used for increasing torque of the electric machine.

13. The multistage transmission according to claim 12, wherein a rotor of the electric machine is continuously connected to the carrier of the fourth planetary gear set (P4).

* * * * *